No. 614,507. Patented Nov. 22, 1898.
C. W. SKINNER.
SYSTEM OF IRRIGATION.
(Application filed Nov. 8, 1897.)
(No Model.) 2 Sheets—Sheet 2.
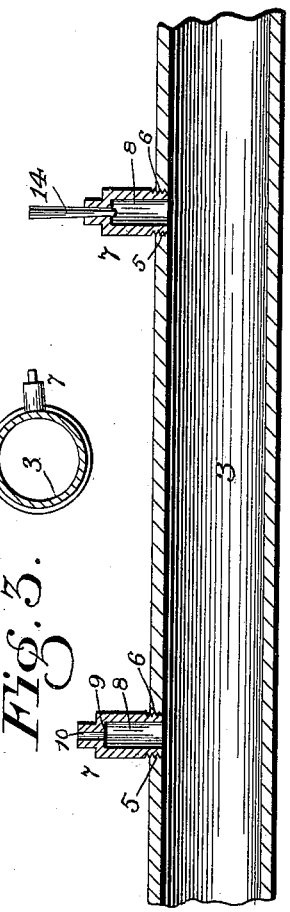
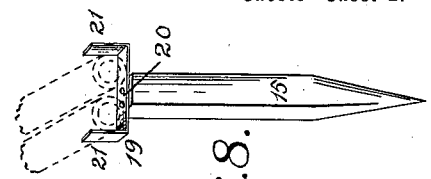
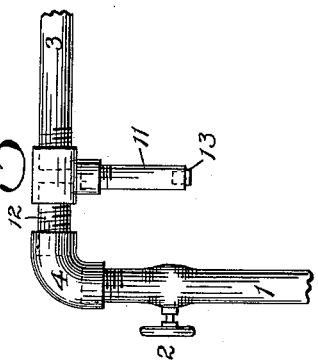
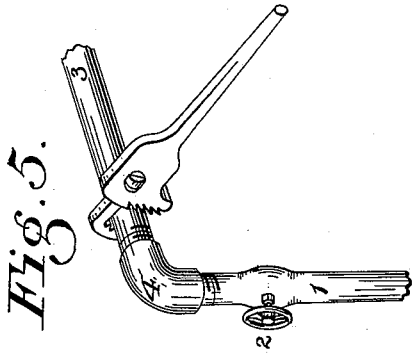
WITNESSES:
Wm H Gilbert
Jean S. Oakes
INVENTOR:
Charles W. Skinner,
BY
Frank M. Burnham.
his ATTORNEY.

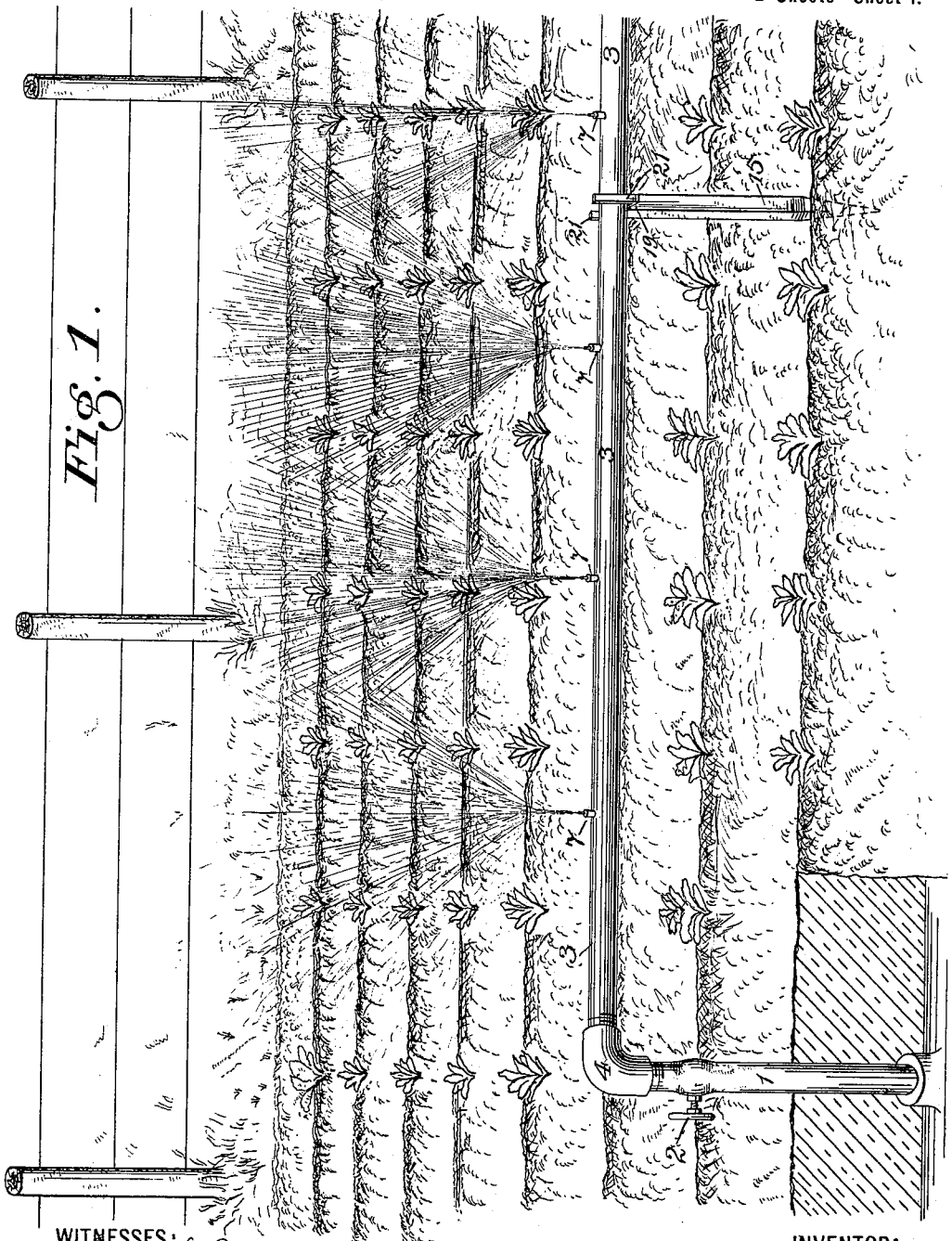

UNITED STATES PATENT OFFICE.

CHARLES WILBER SKINNER, OF TROY, OHIO, ASSIGNOR OF ONE-HALF TO ROBERT C. DAUGHERTY, OF SAME PLACE.

SYSTEM OF IRRIGATION.

SPECIFICATION forming part of Letters Patent No. 614,507, dated November 22, 1898.

Application filed November 8, 1897. Serial No. 657,793. (No model.)

*To all whom it may concern:*

Be it known that I, CHARLES WILBER SKINNER, a citizen of the United States, residing at Troy, in the county of Miami and State of Ohio, have invented certain new and useful Improvements in Pipes and Systems of Irrigation; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pipes and system of irrigation; and it consists in employing pipes provided with nozzles of peculiar form and other novel features, as will be fully described, and distinguished in the claims, according to the statute made and provided therefor.

The main objects of my invention are the construction of a plant or system of irrigation that will be of both simple and ready construction and of such small and trifling cost as to be within the reach of small market gardeners and nurserymen, and although particularly adapted for the irrigation of agricultural lands it can also be used in the shape of short pipes and attached to an ordinary rubber hose for spraying flower-beds and lawns of private residences. A further and very important use of my invention is that it affords the best stationary means yet found for spraying the streets and thoroughfares of cities and towns.

Referring to the accompanying drawings, illustrating my invention, and in which similar numerals of reference indicate like parts in all the several views, Figure 1 is a perspective view showing the practical application of my invention. Fig. 2 is a plan view showing my invention in the form of a short pipe attached to an ordinary rubber hose as used to spray the grounds of private residences. Fig. 3 is an enlarged transverse sectional view of the short pipe shown in Fig. 2 provided with more than one row of nozzles when it is desired to more quickly spray the grounds. Fig. 4 is a vertical longitudinal sectional view of a portion of pipe, showing one of the nozzles opened or in use and one of the nozzles when not in use as closed by means of a wooden plug. Fig. 5 is a perspective view showing a portion of my irrigating-pipes with an ordinary form of pipe-wrench gripping the horizontal pipe when it is desired to rotate the same and throw the water in an opposite direction. Fig. 6 is a side view of my irrigating-pipes, showing a T having a short pipe or handle connected to the horizontal pipe for rotating the same when it is desired to throw the water in an opposite direction. Figs. 7 and 8 are different forms of upright standards for supporting the horizontal pipes.

Referring to the numerals of reference as aforesaid, 1 represents short vertical pipes of suitable height connected in a proper manner to a city water-main or any reservoir having a water-supply of sufficient pressure. 2 is a valve for regulating the current of water in its passage from and into the horizontal pipe 3, said vertical and horizontal pipes being connected together at their screw-threaded ends by an ordinary screw-threaded elbow 4. The pipes may be preferably arranged in parallel rows or at right angles or in any form that will be best adapted to cover the largest area with water, according to the nature of the ground to be sprayed.

Fitted into internally-screw-threaded openings 5, at a few feet apart, are inserted the externally-screw-threaded ends 6 of a number of small nozzles 7, each having a main bore or opening 8, which forms an inside annular shoulder 9 at its top, and connecting with said main bore is a smaller bore or discharge-opening 10, which is of small enough circumference so that a strong but compact stream or jet of water will be forced by its pressure through this discharge-opening, and as the horizontal pipes are rotated by means of a small pipe 11, which forms a convenient handle and is connected by its screw-threaded end to a T, as shown in Fig. 6, having screw-threaded connection with a horizontal pipe 3 and a short pipe 12, which in turn has screw-threaded connection with elbow 4, their nozzles are brought to a slight incline, and in this position the stream or jet of water, by reason of its pressure and the construction of the main bore 8, annular shoulder 9, and small discharge-bore 10, is thrown in a compact stream at sufficient height to catch any breeze or variations of the air, and is thus spread in an even spray over the land to be irrigated or street to be sprayed or watered.

Pipe 11 has its end provided with a plug 13 or a screw-threaded cap for securely closing it, which is adapted to be readily removed at all times, so as to allow any deposits of dirt or sand to be immediately washed out by the action of the water.

When the nozzles are not in use and for the purpose of protecting their discharge-opening 10, or when it is desired to use only a certain number of nozzles, so as to spray only a certain distance or spread a certain amount of water over the ground, a soft wooden plug 14 is employed to close said discharge-opening, which affords a ready and inexpensive method, or, if desired, the top ends of the nozzles 7 may be screw-threaded and have a screw-threaded cap placed over bore 10.

For the purpose of supporting the horizontal irrigating-pipes 3, especially when said pipes are of great length, owing to the area to be sprayed, I employ standards or upright supports 15, as illustrated in Figs. 7 and 8, which are inexpensive and can be readily constructed and be forced into the ground to any desired height, the style shown in Fig. 7 comprising an upright standard 15, formed with a tapering and pointed end and provided at its top with rollers 16, which revolve and turn or roll the pipes, so as to bring their nozzles in the direction desired when said pipes are rotated, although I preferably employ the style shown in Fig. 8, consisting of a standard 15, formed with a tapering and pointed end and provided at its top with a flat piece or strap of metal 19, securely attached to its standard at 20 by nails or screws and having its ends 21 bent at right angles, so as to support the horizontal irrigating-pipe and allow it to roll or turn when it is rotated, as just above described.

The horizontal pipes 3 by means of their screw-threaded ends can be readily rotated when the short pipe, T, and handle, as shown in Fig. 6 and above described, are provided; but this is not essential, as the horizontal pipes may be constructed plain and without any stationary means for turning them, as shown in Fig. 1, and any convenient device or tool that will grip them may be used—as, for instance, an ordinary pipe-wrench, such as is illustrated in Fig. 5.

In Fig. 2 I have shown a style of irrigating-pipe for spraying the lawns or small flower-beds of private residences, consisting of a small pipe 3, provided with a row of my nozzles 7, or two rows when desired, as shown in Fig. 3. Pipe 3 has one end closed by a removable cap or plug 22, so as to allow of the grit, sand, or sediment in the water to be washed out, while the other end is adapted to have a screw-threaded connection with the end of an ordinary rubber hose provided with a cock 23 at the point where its mouthpiece is removed.

My system of irrigation when used in spraying vegetable and flower gardens or nursery-stock or like purposes may have its irrigating-pipes connected with a reservoir containing any liquid poisons for exterminating any dangerous insects or parasites which may be destroying the vegetables, flowers, or trees—such, for instance, as in the case of potatoes, liquid paris-green may be used for exterminating the potato-bugs and will be found the most effective means for this purpose.

When my pipes are used in irrigating agricultural lands located too far from the water-main of a town to connect therewith, any ordinary force-pump may be used in the usual manner for forcing the water through the pipes.

I do not limit myself to the exact style or form of any of the parts of my improved pipes and system of irrigation, as they may be somewhat varied without departing from the spirit of my invention; but

What I claim, and desire to secure by Letters Patent, is—

1. In a system of irrigation, a device for rotating the pipes, comprising a T, a short handle pipe, having a removably-closed end, connected thereto, substantially as set forth.

2. In a system of irrigation, a pipe having openings, in combination with a nozzle 7 having a continuous discharge-opening forming a large and small bore, an inside annular shoulder between said large and small bore; the end of said pipe making a screw-threaded connection with a T, provided with a short pipe or handle, substantially as set forth.

3. In a system of irrigation, the combination with a pipe having openings, of nozzles each having a continuous discharge-opening; the end of said pipe making a connection with a T provided with a short handle pipe; and a short pipe having a connection with said T and an elbow; of a vertical pipe provided with a valve and connected to said elbow, substantially as described.

4. The combination in a system of irrigation, of pipe 3 having openings 5; nozzles 7 each having the large bore 8 the small bore 10, the annular shoulder 9 between said large and small bores; the T connected to said pipe and provided with the short handle pipe 11; the short pipe 12 located between and making a connection with said T and an elbow; the elbow 4; the vertical pipe 1 provided with the valve 2 and connected to the said elbow; and the standard 15 for supporting the longitudinal pipe, one end of which is adapted to be forced in the ground, the other end provided with the rollers 16, substantially as and for the purposes set forth and specified.

5. In a system of irrigation, the combination with an irrigating-pipe provided with screw-threaded openings, of nozzles each having a continuous discharge-opening forming a large and small bore, an inside annular shoulder between said large and small bores; said pipe adapted to form a connection with a rubber hose provided with a cock, substantially as specified.

In testimony whereof I have affixed my signature in presence of two witnesses.

CHARLES WILBER SKINNER.

Witnesses:
F. M. BURNHAM,
C. F. GROSVENOR.